S. M. STONE.
LEAF SPRING SHACKLE.
APPLICATION FILED MAY 25, 1917.

1,336,446.

Patented Apr. 13, 1920.
3 SHEETS—SHEET 1.

Inventor:
Samuel M. Stone

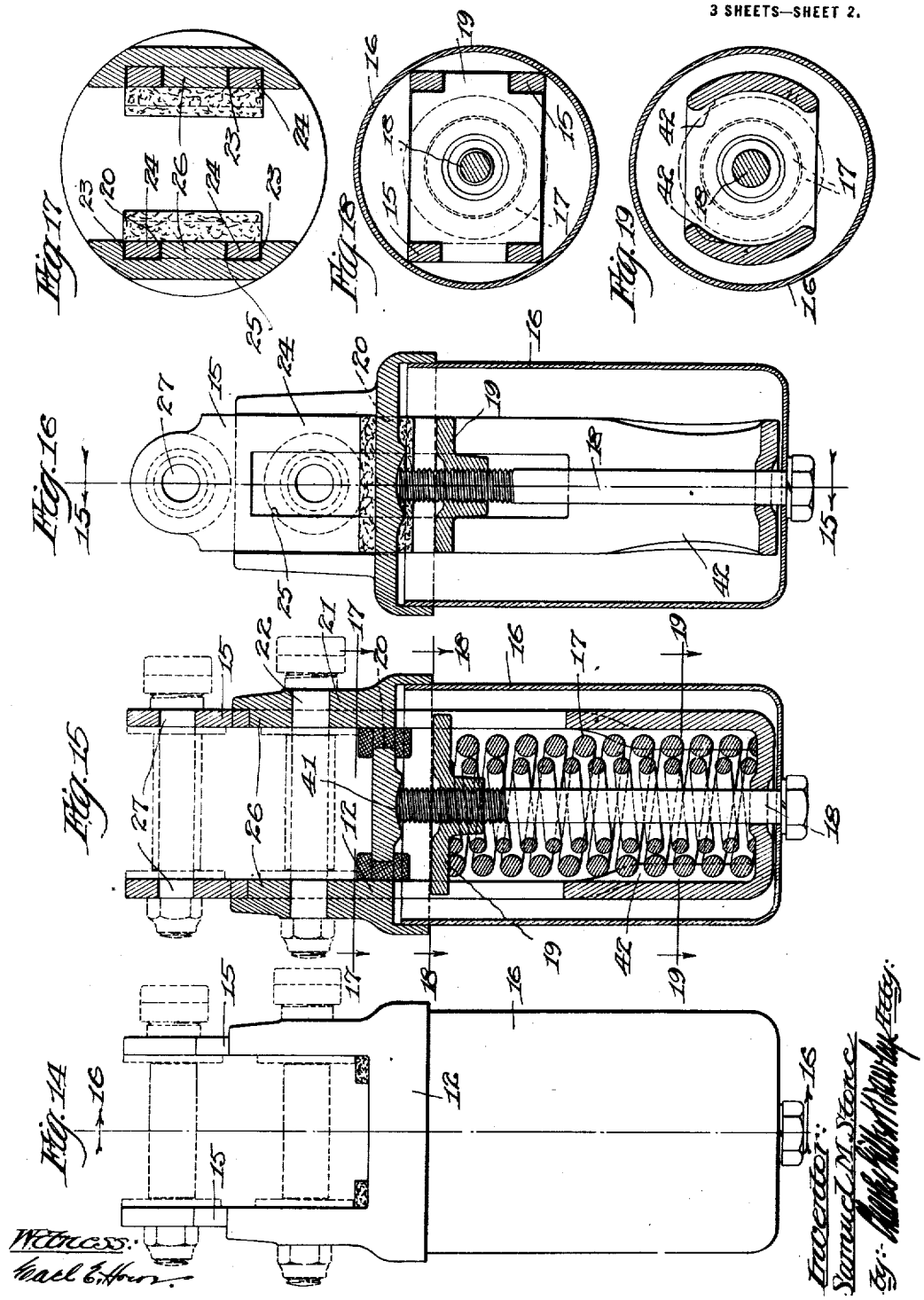

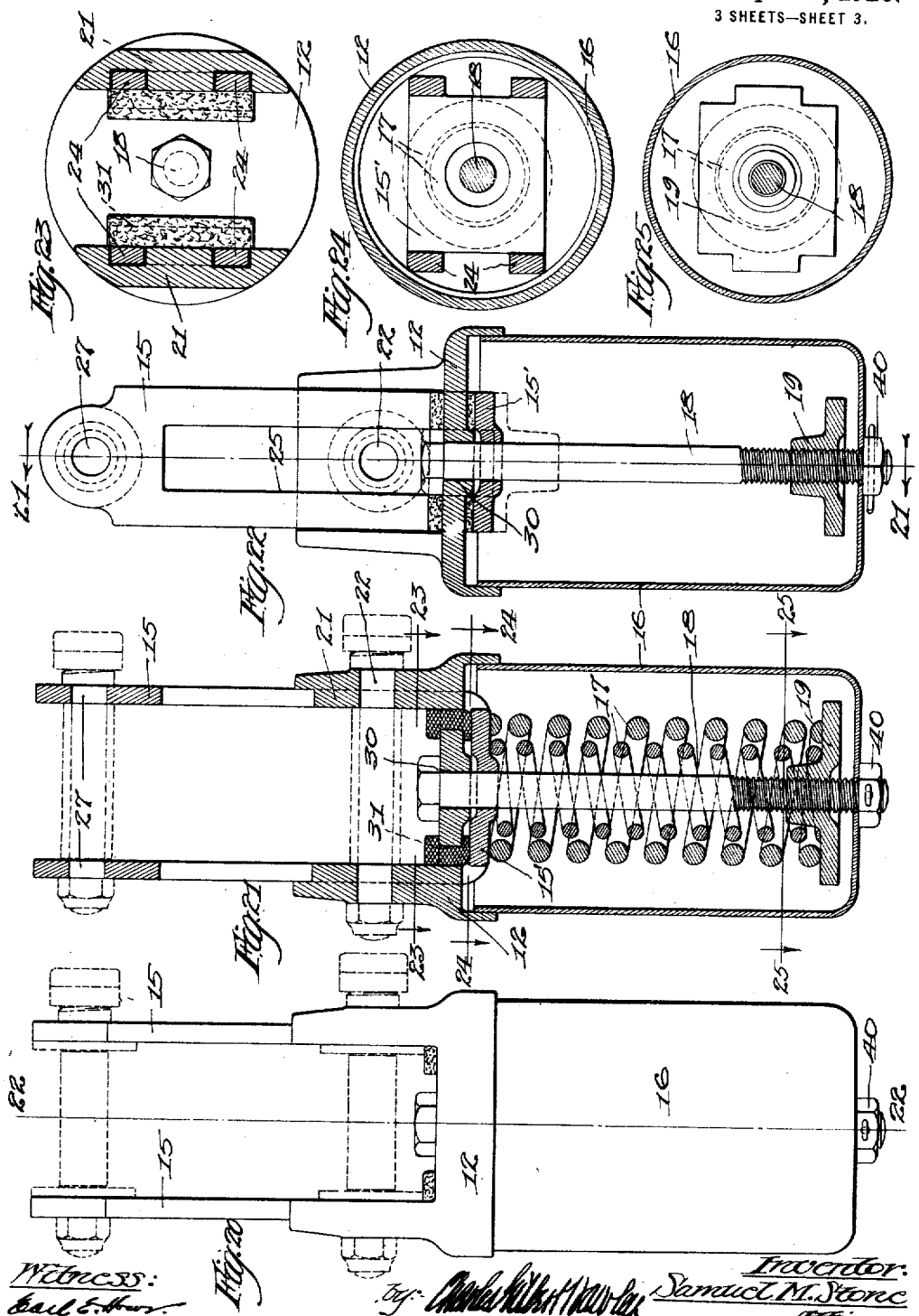

UNITED STATES PATENT OFFICE.

SAMUEL M. STONE, OF CHICAGO, ILLINOIS.

LEAF-SPRING SHACKLE.

1,336,446.      Specification of Letters Patent.      Patented Apr. 13, 1920.

Application filed May 25, 1917. Serial No. 170,942.

*To all whom it may concern:*

Be it known that I, SAMUEL M. STONE, a citizen of the United States, and a resident of Chicago, Cook county, Illinois, have invented certain new and useful Improvements in Leaf-Spring Shackles, of which the following is a specification.

My invention relates to improvements in shackles for the leaf springs which are used between the running gears and bodies of motor vehicles. I call the invention a shock absorber. It is a supplemental spring cushion, which amplifies and softens the yielding action of the leaf spring and delays or slows down the rebound thereof. It enhances the comfort of the persons in the vehicle and goes far as a protection against road shocks which might otherwise break the springs and connected parts.

There are two general classes of load-carrying leaf springs. In the one class, the shackled end of the spring tends to separate from its companion spring or frame member. A leaf spring of the other class has an opposite action and tends to close upon the part to which it is shackled. My shock absorber is characterized by a coiled spring and by providing for two distinct relations of the parts which hold this spring, so that the device, in the one case, is made a distensible shackle, and in the other, is made a compressible shackle; thus I adapt it for use with both classes of leaf springs.

Figures 11, 12:
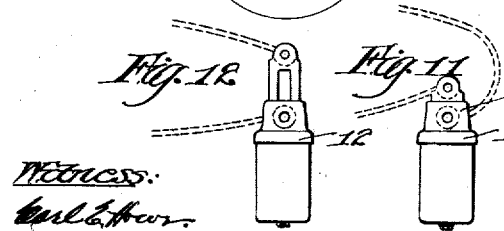
Figure 13:
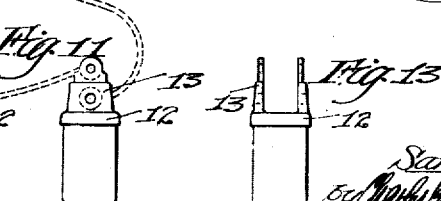

The invention will be understood readily on reference to the drawings which form part of this specification, and in which:

Figures 1, 2, 3, 4, 5 and 6 are diagrammatic views illustrating several uses of my distensible shackles or shock absorbers:—Figs. 7, 8, 9 and 10 are like views illustrating the uses of my compression type shackles or shock absorbers;—Fig. 11 is an enlarged side view of the elastic shackle;—Fig. 12 is a like view of a compression shackle;—Fig. 13 shows how the shackle is adapted to platform springs;—Figs. 14 to 19 are further enlargements of the distensible type of the shock absorber,—Fig. 15 being a section on the line 15—15 of Fig. 16 except that the springs are shown in this view;—Fig. 16 being a section on the line 16—16 of Fig. 14 except that the springs are omitted better to disclose the construction of certain parts;—Fig. 17 being a section on line 17—17 of Fig. 15;—Fig. 18 being a section on line 18—18 of Fig. 15; and Fig. 19 being a section on line 19—19 of Fig. 15.

Figs. 20 to 25 inclusive are similar views of the compression type shock absorber, Fig. 20 being an elevation; Fig. 21 being a vertical section substantially on line 21—21 of Fig. 22 except that the springs are shown; Fig. 22 being a vertical section substantially on the line 22—22 of Fig. 20 except that the springs are omitted better to disclose the construction of certain of the parts; Fig. 23 being a transverse section on line 23—23 of Fig. 21; Fig. 24 being a transverse section on the line 24—24 of Fig. 21; and Fig. 25 being a transverse section on line 25—25 of Fig. 21. The springs are omitted in Figs. 23, 24 and 25.

Figure 1:
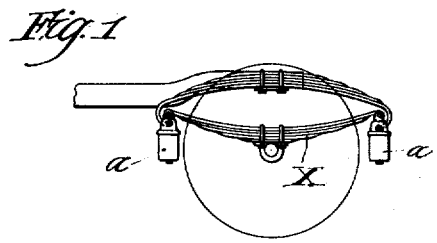
Figure 6:
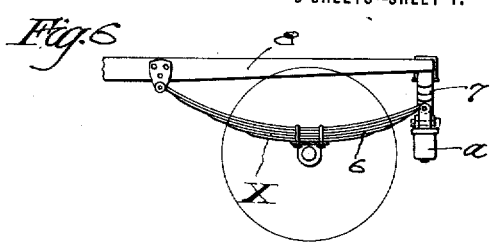
Figure 2:
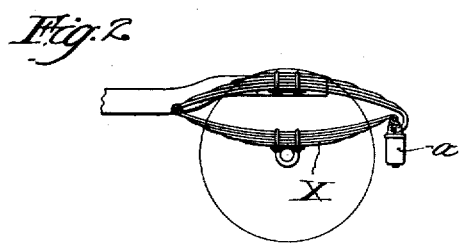
Figure 7:
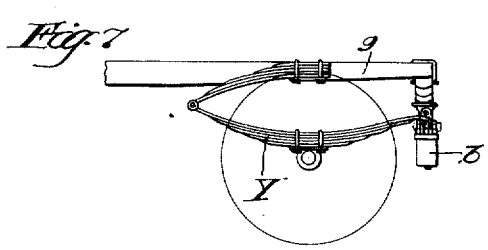
Figure 3:
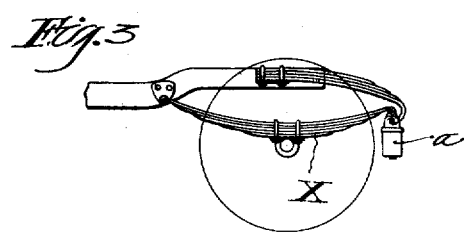
Figure 8:
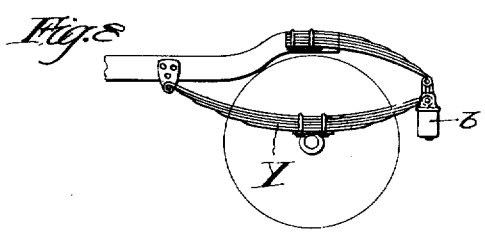
Figure 4:
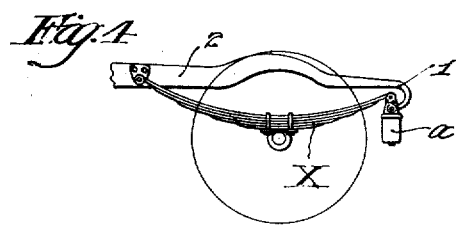
Figure 9:
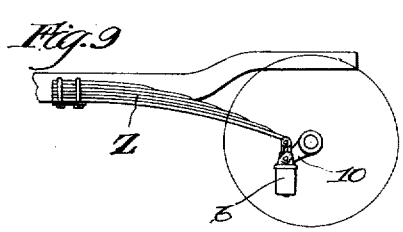
Figure 5:
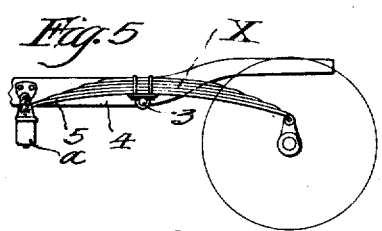
Figure 10:
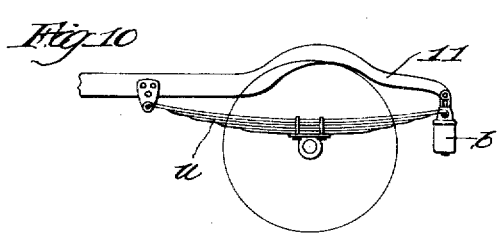

My invention is adapted for use with automobile leaf springs of all kinds. The drawings disclose many of the special uses. Thus Fig. 1 shows a full elliptic spring, of a form having its members shackled at both ends, and making two of my distensible shackles (*a*) the desirable equipment. In Fig. 2 the members of the full elliptic leaf spring are pivotally joined at one end; and hence only one elastic shackle is required. Fig. 3 illustrates the application of the distensible shackle to a three quarter elliptic leaf spring of the kind in which the members tend to separate at their shackled ends. Fig. 4 illustrates a half or semi-elliptic spring with a distensible shackle joining the free end of the leaf spring to the overhanging end, 1, of the automobile frame, 2. Fig. 5 illustrates a leaf spring of the cantaliver type, same being fulcrumed at point, 3, on automobile frame, 4, with a distensible shackle, A, between its forward end, 5, and the frame, 4. Fig. 6 illustrates the position of the distensible shackle (*a*) between the members, 6 and 7, which constitute the platform springs of the automobile, 8.

Obviously, the shackled end of each main spring, X, appearing in Figs. 1 to 6, tends to separate from the other spring, or from the frame member, to which it is joined, hence the use of spring shackles or shock absorbers of the distensible type.

The contrary is true when the leaf springs tend to close upon their companion parts as instanced in Figs. 7, 8, 9 and 10. In such cases it is necessary that my distensible shackles shall be of the compression type. Thus in Fig. 7 it appears that the main member, Y, of the three-quarter elliptic spring tends to close against the frame portion, 9, and a compression type shackle (b) is used. A like condition is encountered in the case of the leaf spring shown in Fig. 8. The cantaliver spring, Z, of Fig. 9 tends to close upon the supporting arm, 10, of the automobile axle and hence requires a compression type shackle (b). In like manner where so-called "flat springs," u, are employed (see Fig. 10) a compression shackle (b) is required between the spring and the frame, 11.

The somewhat enlarged figures, 11 and 12, disclose the difference in the appearance of the distensible and the compression type shackles. By providing the main or head member, 12, with ears, 13, as shown in Fig. 13, either of the shackles may be adapted for use in direct connection with spring members which are right angles to one another, as in the case of platform springs. The normal external appearance of the compression shackle is the same as that of the distensible shackle when the latter is in elongated condition. The structural differences are internal rather than external.

Referring now to Figs. 14 to 19, for the details of the distensible shackles, and to Figs. 20 to 25 for the details of the compressible, or compression type, shackle, it will be noted that the devices are essentially the same except in the disposition of the coiled springs. In each case there is a main member or head, 12, a relatively movable bifurcated yoke, 15, a cylindrical casing or cup, 16, one or more coiled springs, 17, a spring adjusting bolt, 18, and a spring follower, 19, the latter being adjustable on said bolt. The heads, 12 are substantially identical likewise the casings, 16. So far as the operation is concerned, the chief difference is that in the case of the distensible shackle, the follower, 19, is arranged between the spring and the head, 12, whereas in the compressible shackle the follower is at the bottom and the spring occupies a place between the follower and the head, 12, or to be exact, between the follower and the bottom 15' of the yoke, 15. As best shown in Figs. 15, 16, 21 and 22, the head 12 is circular and contains the parallel slots, 20. On the outer sides the slots are bordered by the parallel upstanding sides or ears, 21. The latter contain the shackle bolt holes, 22, in the plane of the axis of the head, 12 and casing, 16. The inner face of each ear, 21, contains two parallel grooves, 23, which open through the top and at the bottom merge with the respective slots, 20. These grooves receive the portions 24 of the yoke 15 which define the slot 25 that accommodates the portion 26 of the head. In this manner a way is provided permitting relative movement of the head and yoke and positively and accurately guiding the yoke in its to and fro movement. In the upper ends of the yokes I also provide bolt holes 27, for the other shackle bolts. In the case of the compressive type the spring adjusting bolt, 18, passes through a hole 30, in the center of the head, 12, and the follower 19, is threaded upon the lower threaded end 18, of the bolt. It should be obvious that the load in this instance will be carried by the head through the instrumentality of the bolt and springs. In other words as the vehicle wheels strike obstructions the head moves up relative to the yoke and thus compresses the spring. In use there will be an almost constant relative movement of these parts and they are therefore subjected to considerable friction tending to wear away the contacting metal parts and ultimately causing an objectionable looseness. To prevent this I provide simple means for lubricating the moving parts thus adding greatly to the life thereof. To this end I prefer to provide elongated slots, 31, in the head, 12, contiguous the slots 20 and 23. In these slots I place lubricating material such for example as felt saturated or partially saturated with oil. These pads of lubricating material are preferably slightly thicker than the slots and are slightly compressed when placed in position. They thus frictionally maintain their position against undesired removal or loss. As will be best seen by referring to Figs. 16, 17, 21 and 22 the lubricating pads press against the inner surfaces of the yoke and the lubricating material is thus enabled readily to find its way to the sliding surfaces. These pads also serve effectively to prevent the entrance of dust, dirt and other foreign material to the spring chamber and as the casing, 16, entirely covers the springs from below little, if any, foreign matter finds its way to the springs. A nut, 40, holds the casing firmly in place against lost or undesired movement.

In the case of the distensible shackle, the spring adjusting bolt does not extend through the head, 12, but does extend through the yoke. The threaded end of the bolt abuts against the under side of the head, 12. In order to center the bolt I prefer to provide a central concavity, 41. It will be evident that road shocks will cause the compression of the springs, X, in this arrangement.

In the distensible type the springs are mounted within the yoke and in order to prevent undue shifting I prefer to form the yoke sides into arcs of a circle closely approximating the spring as indicated at 42.

It should be noted that in both instances the cup, 16, makes or constitutes a brace or positioner for the spring adjusting bolt. The cup or shell therefore alines the bolt. The bolt on the other hand forms a guide for the yoke which slides thereon. In this manner all the parts are maintained firmly and accurately in their proper positions.

It should now be evident that with the same structure disposed in different relations, either a distensible or a compressive type shackle can be provided.

I claim:

1. The herein described improvements in leaf spring shackles comprising in combination a head, a yoke mounted thereon for relative sliding movement, a bolt depending from the head extending through the lower end of the shackle, a follower threaded on the lower end of the bolt, a spring interposed between the follower and the lower end of the yoke, and a casing inclosing the spring, engaging the head, and positioning the lower end of the bolt.

2. The herein described improvements in leaf spring shackles comprising in combination an annealed cast iron head, a yoke mounted thereon for relative sliding movement, a spring to retard relative sliding movement, and a bolt for adjusting the spring, said yoke and head being formed to permit such placement of the yoke as will constitute a distensible shackle in one instance and a compressible shackle in the other and said head being of a shape to receive an opening to accommodate the adjusting bolt when the device is to constitute a compressible shackle.

3. The herein described improvements in leaf spring shackles comprising in combination a head formed with upstanding ears, a strap metal yoke mounted for movement relative to the head and slidably engaging the ears, a bolt for adjusting the spring, said yoke and head being formed to permit such placement of the yoke as will constitute a distensible shackle in one instance and a compressible shackle in the other and said head being adapted to receive a bolt opening to accommodate the adjusting bolt when the device is to constitute a compressible shackle.

In testimony whereof, I have hereunto set my hand this 22 day of May, 1917.

SAMUEL M. STONE.